INVENTOR.
PAUL GREEBLER

ATTORNEY 3,266,998
DOPPLER COEFFICIENT CONTROL FOR NUCLEAR REACTORS OPERATING IN THE FAST OR INTERMEDIATE NEUTRON ENERGY SPECTRUM
Paul Greebler, San Jose, Calif., assignor to the United States of America as represented by the United States Atomic Energy Commission
Filed Feb. 14, 1964, Ser. No. 345,056
4 Claims. (Cl. 176—41)

The invention described herein was made in the course of, or under, Contract No. AT(04-3)-189, Project Agreement 10, with the United States Atomic Energy Commission.

This invention relates to nuclear reactors and in particular to the control of nuclear reactors operating in the fast or intermediate neutron energy spectrum generally above 10,000 ev. utilizing shifts in the Doppler coefficient of reactivity.

The particular object of this invention is to regulate the Doppler coefficient of reactivity in order to make the operation of the reactor inherently safe without sacrificing neutron economy. To make the reactor inherently safe, an arrangement or method of operation is provided which causes the Doppler coefficient to vary in a negative direction, i.e., as the temperature of the reactor core increases, the rate of fission of the fissile fuel material decreases and concurrent rate of energy output decreases.

The applicability of this invention is not restricted to any particular reactor, coolant, structure or fuel material other than that a reactor must have a fast or intermediate energy spectrum. It would be particularly useful in large fast ceramic reactors using oxide or carbide fissile fuel. However, it is also useful in cermet, metallic, powder or other type fuel reactors. The sodium cooled FERMI-I, EBR-I and EBR-II fast reactors are examples of existing reactor types which could beneficially incorporate this invention. The present invention is also applicable to other types of reactors in the fast or intermediate neutron energy spectrum class where core size is so large that thermal expansion of the fuel does not provide a sufficiently large temperature coefficient of reactivity to effectively control an excursion. Furthermore, in present plutonium fueled fast and intermediate reactors, the ratio of fissile to fertile material is limited to a low value because the Doppler coefficient of reactivity will go unsafely positive if too high a percentage of fissile material is present. This factor limits the amount of fissile material present in the core thus requiring a shorter refueling cycle than when this invention is used.

It is, therefore, an object of this invention to provide means for making the Doppler coefficient of reactivity of a fast or intermediate neutron energy reactor more negative for the purpose of controlling the reactivity of the reactor.

It is a further object of this invention to provide means for modifying the Doppler temperature coefficient of reactivity of a fast or intermediate neutron energy reactor so that the operating safety of the reactor is improved.

It is a still further object of this invention to provide means for modifying the Doppler temperature coefficient of reactivity of a fast or intermediate neutron energy reactor so that as the temperature of the reactor core increases, the rate of fission of fissile material decreases.

It is another object of this invention to provide means whereby the refueling cycle of a fast or intermediate neutron energy reactor is lengthened.

It is but another object of this invention to provide means whereby the ratio of fissile to fertile material within the core of a fast or intermediate neutron energy reactor may be increased.

Other objects and advantages will be apparent to one skilled in the art from the following description taken with the accompanying drawings, in which.

Fast reactor design concepts generally are based on including as little moderating material as possible in the reactor core except such material as is necessary to satisfy thermal and structural requirements.

In thermal class reactors, the moderator material generally occupies the largest fraction of the core volume and is intended to bypass the strong U-238 or Th-232 neutron absorption resonances and beocmes thermalized, i.e., become slowed down to less than one electron volt. Such an energy spectrum is shown in FIGURE 2 as curve 3. In contrast is the typical energy spectrum of a fast (hard) or intermediate reactor neutron spectrum shown in FIGURE 2 as curve 5. When superimposed on the resonance absorption curves 1 and 2 of FIGURE 1, it can be seen that only a small percentage of the active neutrons have energies in the resonance absorption region.

Figure 1:
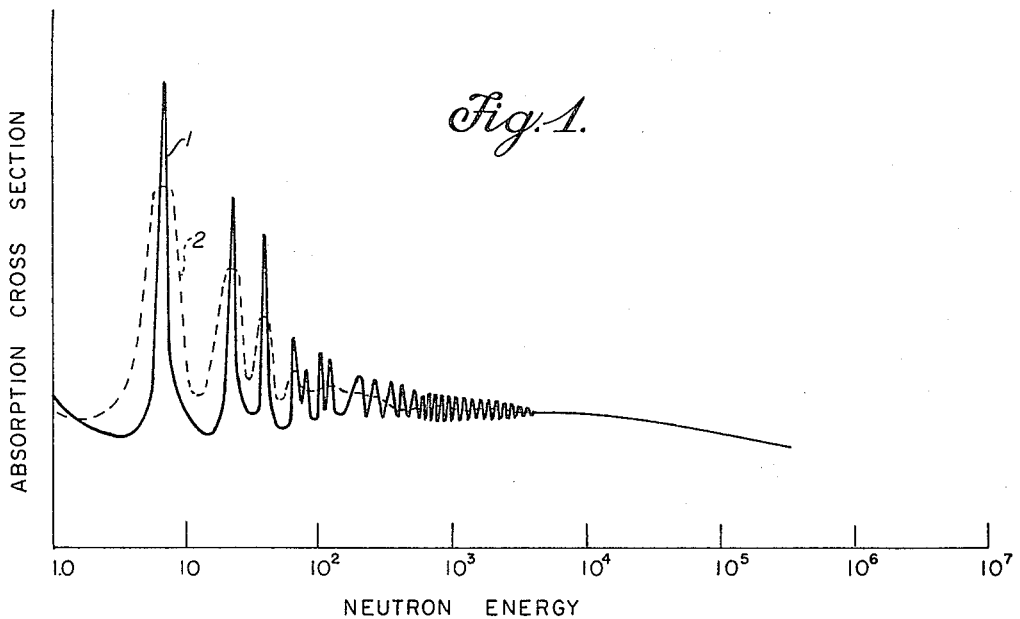
FIGURE 1 is a plot of the reasonance absorption cross section of U-238 as a function of neutron energy for both with and without Doppler shift broadening.
Figure 2:
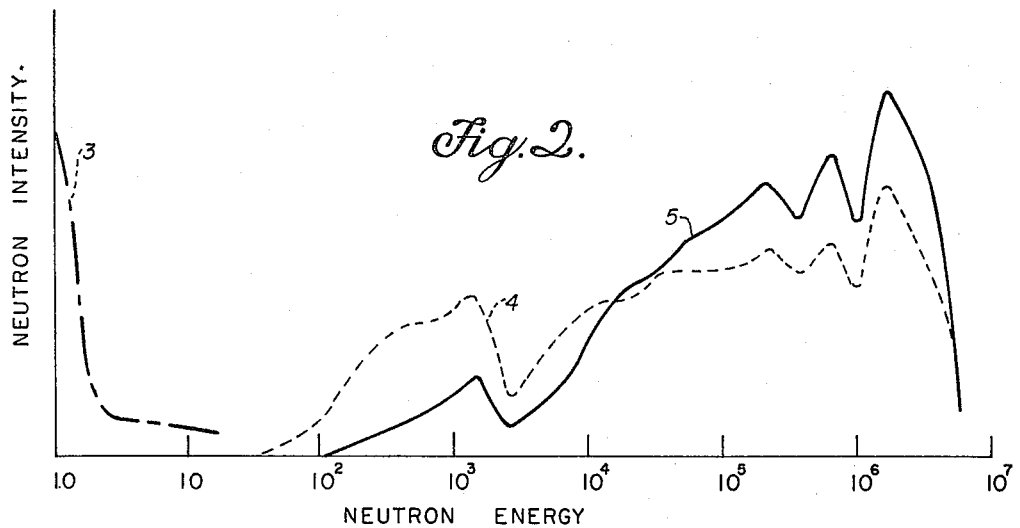
FIGURE 2 is a plot of neutron intensity as a function of neutron energy for fast, degraded-fast, and thermal reactors.

Referring to FIGURE 1, curve 1 represents the typical neutron resonance absorption spectrum of U-238 at room or only slightly higher temperatures. Any neutrons having energies in the region of maximum absorption peaks when colliding with atoms of U-238 will be absorbed and lost from the fission process. This curve 1 generally typifies the resonance absorption curves also of Th-232, Pu-240 or U-234. As the temperature of the material increases, the generally chaotic motion of the target atoms about their lattice sites will increase in accordance with the well known Maxwellian velocity distribution. As a neutron passes through the material, which is now at a higher temperature, with a certain velocity, represented by its energy level, it will "see" the target atoms as moving away, toward or motionless depending upon the target atoms vectorial velocity relative to the neutron. The effective energy, so far as resonance absorption is concerned, is associated with the relative velocity (energy) of the neutron and target atom. Thus a neutron of velocity (energy) slightly higher than the low temperature resonance peak might see, relative to itself, a target atom moving in a direction giving it an effective energy (vectorial velocity) level to cause resonant absorption of the neutron. Likewise, a neutron of velocity (energy) slightly lower than the low temperature resonance peak might see, relative to itself, a target atom with an effective energy (vectorial velocity) to cause resonant absorption of the neutron. Summing up the resonant absorption distribution at higher temperatures results in a widening of the resonant absorption bands and lowering of their peaks as illustrated by curve 2 in FIGURE 1. This broadening of the resonant absorption bands is due to the well-known Doppler effect. The Doppler temperature coefficient of reactivity is a factor relating the Doppler effect to the rate of fission of fissile material as the temperature of the material increases. A negative value for the Doppler coefficient means that the Doppler effect predominates and as the temperature of the reactor core material increases, the neutrons having energies in the Doppler region, i.e., where resonance absorption is greatest, are absorbed causing the rate of fission of fissile material to decrease. On the other hand, a positive Doppler coefficient means that there are so few neutrons having energies in the Doppler region that the temperature of the core may increase to infinity (theoretically) unless poisoning (neutron absorbing material) can be added by some supplementary agency to reduce the rate of fission. In fast reactors, the rate at which the core and fuel temperature might rise in the case of insertion of added reactivity can be in the range of milliseconds or less. Few, if any, supplementary control systems can operate with sufficient rapidity and reliability to achieve essentially safe operation. It is desirable, therefore, to incorporate an inherent method of reducing the rate of temperature rise resulting from addition of reactants.

The method of reducing the rate of temperature rise according to this invention involves the addition of certain materials capable of moderating neutrons to appropriately modify the Doppler coefficient. These materials include BeO, graphite, beryllium metal, MgO, $Al_2O$, polyethylene, Inconel or zirconium hydride separately or in combination in a specific amount disposed in the core of the reactor. The specific amount of material that has been found necessary for adequate control of the Doppler coefficient is that amount necessary to degrade the fast neutron spectrum, typified in curve 5 of FIGURE 2, to the spectrum as typified in curve 4 of FIGURE 2. In this case, approximately 20% to about 30% of the fission producing neutrons in the reactor core have energies in the Doppler region. This Doppler coefficient modifying material may be added to the reactor core by either mixing said material with either or both the reactor coolant or fuel, or by interspersing this material in discrete quantities throughout the core to form a lattice arrangement. These discrete quantities may be in the form of granules, rods, cladding, alloyed or dispersed in the reactor core support structure, etc. In one method, BeO, for example, may form a liner or be contained in or contained between the partitions of the fuel elements. It has been found that the addition of BeO in an amount according to the volume ratios between 2 to 1 and 8 to 1 of fuel to BeO will produce Doppler coefficient modification effective to provide an inherently safe temperature coefficient of reactivity without sacrificing neutron economy. Table I illustrates a preferred embodiment of this invention wherein the ratio of fuel to BeO is 4 to 1.

any combination of the above. In case 2 of the above Table I, the BeO replaces a portion of the reactor coolant, which, in this embodiment, is liquid sodium. In this case the BeO may be in the form of rods or in powder or other form suspended in the coolant media which could be either liquid sodium, sodium potassium, mercury or other liquid metal.

For the variety of Doppler coefficient modifying materials found, supra column 4, each material affects the Doppler coefficient to a different degree. For example, only one tenth of the volume fraction of polyethylene is needed to modify the Doppler coefficient to the same degree as BeO. In a similar manner, less zirconium hydride volume is necessary to degrade the neutron energy spectrum as beryllium oxide. In the case of each Doppler coefficient modifying material the amount of material needed depends both on the kind of material and the energy distribution of the neutrons.

To determine the amount of Doppler coefficient modifying material to add; first, the neutron energy spectrum of the reactor is determined either experimentally or by calculations according to methods well known in the art. Second, knowing the moderating characteristics of the various materials noted supra, which characteristics are obtainable from various handbooks and texts such as Nuclear Reactor Engineering by S. Glasstone and A. Sesonski (1963) (D. Van Nostrand Co.), the amount necessary to degrade the neutron spectrum so that approximately 15–30% of the fission producing neutrons will come within the Doppler effect region of 1.0 to 10,000 ev. can be calculated according to methods well known in the art. The Doppler coefficient modification can then be determined by mathematically comparing the curve of resonant absorption with the curve of the degraded neutron spectrum at the various temperatures by methods well known in the art.

In operation, this invention acts as a self-limiting or inherent means of controlling fluctuations in reactivity within a reactor core. As stated supra, as the temperatures of the U-238 increases, the resonant absorption peaks shown in curve 1 of FIGURE 1 broaden as illustrated in curve 2. The magnitude of the absorption peaks at lower temperatures is normally such that they are self- TABLE I.—INCREASE OF DOPPLER COEFFICIENT AND EFFECT ON SODIUM COEFFICIENT AND BREEDING RATIOS DUE TO INCLUSION OF MODERATING MATERIAL IN A LARGE FAST OXIDE REACTOR

| Doppler Coef. ($\Delta k/°$ C.) | Case I [1] No BeO (Reference Case) | Case II [2] 8% BeO Replaces Equal Sodium Volume | Case III [3] 8% BeO Replaces Equal Fuel Volume |
|---|---|---|---|
| At 25° C. Avg. Fuel Temperature | $-16.7 \times 10^{-6}$ | $-29 \times 10^{-6}$ | $-30 \times 10^{-6}$ |
| At 725° C. Avg. Fuel Temperature | $-6.7 \times 10^{-6}$ | $-12 \times 10^{-6}$ | $-12 \times 10^{-6}$ |
| At 1,125° C. Avg. Fuel Temperature | $-4.8 \times 10^{-6}$ | $-8 \times 10^{-6}$ | $-9 \times 10^{-5}$ |
| Sodium Voidage: | | | |
| Temp. Coef. ($\Delta k/°$ C.) [4] | $-0.3 \times 10^{-6}$ | $\sim +2 \times 10^{-6}$ | $-0.7 \times 10^{-6}$ |
| Total Loss of Sodium $-\Delta k$ | $\sim -0.5\%$ | | $-1.2\%$ |
| Breeding Ratios of Pu(239+241): | | | |
| Core Only | 0.84 | 0.86 | 0.75 |
| Total (Core and Blanket) | 1.35 | 1.28 | 1.25 |
| Pu (239+241) Critical Mass (kg.) | 980 | 980 | 890 |

[1] 32% fuel ($PuO_2UO_2$), 16% stainless steel, and 52% sodium by volume. Core 3¼ ft. length by 6½ ft. diameter and surrounded by a 15 inch thick blanket containing oxide fertile fuel (initially natural or depleted uranium).
[2] Volume composition of reference core is changed to 32% fuel, 15% stainless steel, 44% sodium, and 8% BeO. This case was calculated for BeO in separate rods from the fuel, although the results would not be much different if the BeO were used as core material for annular fuel elements.
[3] Volume composition of refernce core is changed to 24% fuel, 16% stainless steel, 52% sodium, and 8% BeO. This case was calculated for BeO as core material in annular fuel rods; but the results would not be much different if the BeO were used in rods (or other shapes) separate from the fuel rods.
[4] For uniform removal of sodium in the core and blankets. A 1% reduction of sodium density corresponds to about a 36° C. temperature rise of the coolant.

It will be noted in case 3 of the above Table I that the BeO replaces a portion of the fuel volume. For this embodiment of the invention the BeO may be in the form of rods, cladding, interspersed in the fuel matrix or used as core material in the center of the fuel element, or shielding, i.e., their magnitude is much more than necessary to absorb a neutron at that point in the neutron energy spectrum. Now, in the case of a sudden increase in reactivity such as the dropping of a fuel element within the core during refueling, the sudden removal of a control rod or the boiling, vaporization or loss of sodium in the core, the fissile and fertile material temperature will increase just as suddenly. Such a rise may be in the range of tens of milliseconds which is before the "scram" or poisoning or safety devices may go into action. However with a reactor constructed and operated in accordance with the invention, the almost instantaneous rise in temperature will result in the simultaneous broadening of the resonance absorption peaks. The neutrons having energies lying between the absorption peaks and which contribute to fission of the fissile fuel are progressively absorbed more effectively as the broadening process increases. Since a low magnitude of absorption cross-section is sufficient to capture a neutron, the peak can flatten out considerably before losing effectiveness and the integrated overall effect is to provide a substantially enhanced absorption of neutrons. Thus almost all of the neutrons existing or progressively moderated into the Doppler region are absorbed and do not contribute to the fission process. In this manner, the excursion is controlled by substantially instantaneously deactivating neutrons within the core as the fuel temperature rises. Thus this invention results in increasing the safety of operation of a nuclear reactor operating in the fast or intermediate neutron energy spectrum by providing an inherent means for limiting the destructive effects of rapid changes in reactivity produced by temperature and other excursions.

While this invention has been shown in only a few of its various forms, it is obvious that other modifications may be made without departing from the spirit and scope thereof.

What is claimed is:

1. In a process for operating a nuclear reactor of the type including a core containing fissile material having neutron absorbing resonances in the range of about 1–10,000 electron volts, cooled by a liquid metal and arranged for sustaining a fission chain reaction utilizing neutrons of a fast energy spectrum flux produced in the core, the step comprising distributing a moderator material in the neutron flux region of said core in an amount sufficient to moderate the energy of from about 15% to about 30% of the neutrons in said core into the energy range of about 1 'to about 10,000 electron volts whereat the Doppler coefficient of reactivity of said core is made more negative to increase neutron absorption with increase of the temperature of said core.

2. The process of claim 1 wherein the neutron moderating material is selected from the group BeO, graphite, beryllium, MgO, Al$_2$O$_3$, polyethylene, stainless steel, zirconium hydride.

3. In a process for operating a nuclear reactor of the type including a core containing fissile material having neutron absorbing resonances in the energy range defined by the resonance absorption band region of a fissile material selected from the group consisting of U–238, Th–232, Pu–240 and U–234, cooled by a liquid metal and arranged for sustaining a fission chain reaction utilizing neutrons with a fast energy spectrum flux produced in the core, the step comprising distributing a moderator material in the neutron flux region of said core in an amount sufficient to moderate the energy of from about 15% to about 30% of the neutrons in said core into the energy range defined by the resonance absorption band region for said fissile material selected from the group consisting of U–238, Th–232, Pu–240 and U–234 whereat the Doppler coefficient of reactivity of said core is made more negative to increase neutron absorption with increase of the temperature of said core.

4. A process as defined in claim 3, wherein said moderator comprises BeO in the volume ratio range between 2 to 1 and 8 to 1 of said fissile fuel to BeO.

References Cited by the Examiner

UNITED STATES PATENTS

| | | | |
|---|---|---|---|
| 2,975,117 | 3/1961 | Zinn | 176—40 X |
| 2,993,850 | 7/1961 | Soodak et al. | 176—40 X |
| 3,103,475 | 9/1963 | Szilard | 176—40 X |
| 3,197,376 | 7/1965 | Balent et al. | 176—40 X |

OTHER REFERENCES

Nuclear Reactor Engineering, by Samuel Glasstone et al., D. Van Nostrand, New York, Jan. 28, 1963, pp. 252, 253, 259, 260, 702–707.

REUBEN EPSTEIN, *Primary Examiner.*